Fig. 1

INVENTOR
Robert W. Kearns

INVENTOR
Robert W. Kearns

BY Lane, Aitken, Dunner & Ziems
ATTORNEYS

Sept. 15, 1970  R. W. KEARNS  3,529,227
WINDSHIELD WIPER CONTROL
Filed March 3, 1967  5 Sheets-Sheet 4

INVENTOR
Robert W. Kearns

BY Lane, Aitken, Dunner & Ziems
ATTORNEYS

United States Patent Office 3,529,227
Patented Sept. 15, 1970

---

3,529,227
WINDSHIELD WIPER CONTROL
Robert W. Kearns, 20524 Rutherford Ave.,
Detroit, Mich. 48235
Filed Mar. 3, 1967, Ser. No. 620,525
Int. Cl. H02p 1/00
U.S. Cl. 318—443                       17 Claims

---

ABSTRACT OF THE DISCLOSURE

The specification and drawings disclose an electrical control device for controlling the operation of windshield wiper blades of a vehicle. The control device includes a dashboard mounted control switch having three positions which enables the operator to turn the switch to one position for continuous operation of the wiper blades, to a second position to turn them off, or to a third position for intermittent operation. In the intermittent mode of operation the wiper blades dwell at the end of each wiping cycle for a dwell period determined by the weather with respect to the car as measured by a controlled sample of the moisture falling on the windshield. When the moisture on the windshield increases, the dwell period decreases. When the moisture on the windshield decreases the dwell period increases. Therefore on a wet windshield the number of strokes per minute of the wiper blades increases and on a drier windshield the number of strokes per minute of the wiper blade decreases.

---

CROSS-REFERENCES TO RELATED APPLICATIONS

This invention is an improvement of the invention disclosed in my co-pending application Ser. No. 532,433, filed Mar. 7, 1966, entitled Motor Control Device, which, in turn, is an improvement of the invention disclosed in my copending application Ser. No. 414,973, filed Dec. 1, 1964, now Pat. No. 3,351,836, and entitled Windshield Wiper System.

BACKGROUND OF THE INVENTION

The patents to Amos 3,262,042 and Foreman et al. 3,219,901 disclose two types of prior art electronic control devices for operating windshield wiper blades intermittently. However, neither patent discloses any circuitry for providing the driver with the option of operating the windshield wipers continuously for heavier rain conditions. Further the controls of both patents will operate in the same intermittent mode irrespective of whether the wiper blades slide on the glass or are removed from the glass.

My later filed co-pending application discloses a simplified control which enables the driver to select a continuous or intermittent mode of operation for the windshield wiper blades. The control device employs a printed circuit card fixed on the wiper motor unit in position to co-operate with contact fingers which rotate with the output shaft of the wiper motor unit. In the continuous mode of operation the motor is pulsed on and off with full power supplied to the motor each time it is turned on. By manually varying the off time of each pulsing cycle, the speed of the wiper blades can be controlled. The percentage of on time automatically varies to provide an improved speed-torque curve for the wiper motor.

The printed circuit card arrangement provides a simple and effective way of obtaining a variety of useful switching functions for controlling the operation of the wiper blades, including controlling the pulsing of the motor. A conventional three position dashboard control switch is also provided which is connected to the printed circuit card by a conventional multiple conductor flexible cable.

SUMMARY OF THE INVENTION

This invention simplifies and improves upon the control device of my later filed co-pending application by rotating the printed circuit card while holding the contact fingers stationary. In the preferred embodiment control rings are actually printed on one face of the output gear of the wiper motor unit which gear rotates once for each complete wiping cycle of the wiper blades, a complete wiping cycle comprising an upstroke and a return stroke. The contact fingers are fixed within the wiper motor unit in position to slidably engage the control rings to provide the desired switching functions.

This change eliminates the need for the two sided printed circuit card disclosed in my later filed co-pending application which, in turn eliminates the holes and eyelets required to connect the opposite sides of the printed circuit board. In addition the necessary electrical connections to the individual contact fingers can be made in a very simple and economical manner. By printing the control rings on the face of the output gear, the cost of the unit can be significantly reduced. Or, if desired, the control rings can be printed on a thin flexible plastic sheet rather than a more expensive board material, and then bonded to the output gear which provides the necessary rigid backing for the flexible printed circuit.

The present invention also provides a flexible printed cable which simplifies the connection between the contact fingers mounted within the wiper motor unit and the dashboard control switch positioned to be operated by the driver. Substantially all of the electronic components of the control device are supported by the dashboard control switch itself and the components are connected directly to printed circuitry provided on one end of the flexible printed cable. Additional printed circuitry is provided on the flexible printed cable for co-operating with the dashboard control switch itself to provide the three position switching functions in a more simplified manner.

In accordance with another important feature of the invention, the control device automatically increases the speed of the wiper blades at the turnaround points of the wiping cycles to produce substantially identical wipe patterns on wet and dry windshields. Therefore the windshield wiper drive linkage mechanism can be arranged to bring the edges of the wipe pattern as close to the reveal moulding at the bottom of the windshield and the corner posts at the sides of the windshield as manufacturing tolerances will permit.

In prior art windshield wiping systems a compromise had to be struck between the difference between a dry wipe pattern and a wet wipe pattern. This compromise is one of the important reasons why the well known depressed park feature is added to many windshield wiping systems. Since the control device of the present invention accurately parks the windshield wiper blades at the end of the return stroke which, as previously described, is positioned as close to the reveal moulding as manufacturing tolerances permit, the added depressed park feature is not needed.

Accordingly, it is the primary object of the present invention to provide a simpler and more effective control device for operating wiper blades continuously or intermittently.

Another object of the invention is to provide a control device of the type described above which controls the windshield washer unit to squirt water on the windshield in a "machine gun bullets through the propeller" manner.

A further object of the invention is to provide a contact finger assembly for a wiper motor unit of the type described above which reduces the tolerance build up between the contact fingers and the control rings.

A still further object of the invention is to provide a windshield wiper control device which compensates for the predictable dynamic errors of the windshield wiping system.

A still further object of the invention is to provide a windshield wiper control device which is more accurately responsive to the weather conditions encountered by the vehicle rather than simply being responsive to the moisture accumulated on the windshield over a period of time.

Other objects and features of novelty of the present invention will be specifically pointed out or will otherwise become apparent when referring, for a better understanding of the invention, to the following description taken in conjunction with the accompanying drawings.

BRIEF DESCRIPTION OF THE DRAWINGS

FIG. 12 is an enlarged broken view of the flexible printed cable of the present invention;

FIG. 14 is a plan view of another embodiment of the contact finger assembly of the invention;

FIG. 15 is a side view of the contact finger assembly illustrated in FIG. 14; and FIG. 16 is a fragmentary view of another embodiment of the contact finger and comb assembly of the invention.

DESCRIPTION OF THE PREFERRED EMBODIMENTS

Figure 1:
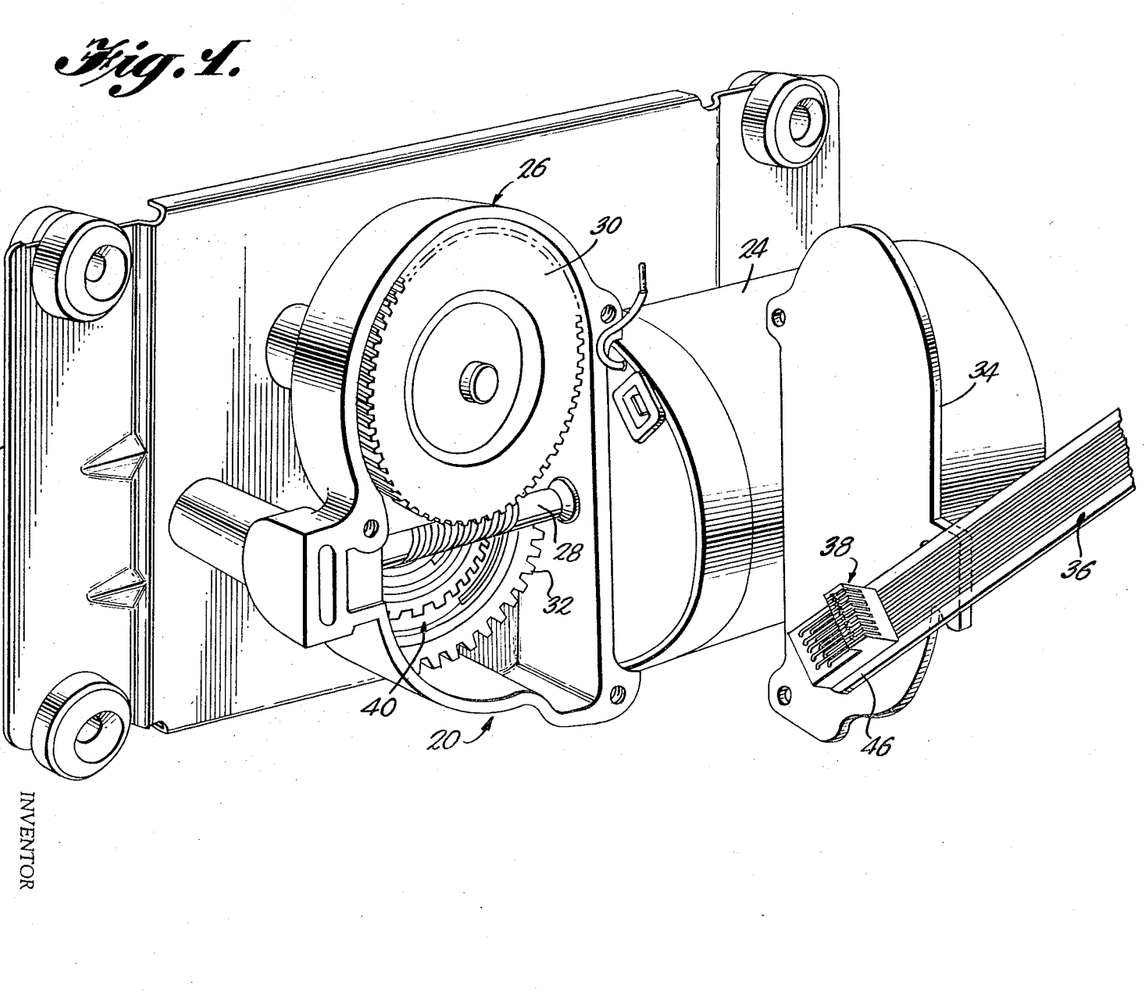
FIG. 1 is a perspective view of a wiper motor unit with the cover plate removed to expose components of the present invention associated therewith.

Referring to FIG. 1, a windshield wiper motor unit 20 is illustrated which embodies features of the invention. It comprises a base plate 22 for mounting the wiper motor unit on the firewall in the engine compartment, an electric motor 24 and a speed reducer unit 26. The speed reducer unit comprises a worm 28 rotated by the motor drive shaft, a worm wheel 30 and output gear 32 rotated by a small pinion gear (not shown) positioned behind the worm wheel 30. The output gear 32 drives an output shaft (not shown) which projects through the base 22 in position to be connected to the linkage assembly for actuating the windshield wiper blades. A removable cover plate 34 is provided for closing the open end of the speed reducer unit. All of the foregoing components are conventional, and therefore, will not be described in greater detail.

A comb and contact finger assembly 38 is mounted on the inside of the cover plate 34 in position to overlie a printed control ring pattern 40 on the exposed face of the output gear 32. One end of each of the ten contact fingers $f0$–$f9$ engages a different one of the ten rings $r0$–$r9$ (FIG. 2) on the control ring pattern. The other ends of the contact fingers are electrically connected to one end 46 of a flexible printed cable 36 which has ten conductive paths printed on the face thereof for connecting the contact fingers to the printed circuit on the enlarged end 130 of the flexible printed cable. The enlarged end 130 is connected to a dashboard mounted control unit 154 (FIG. 10), as will be described in greater detail hereinafter.

Figure 2:
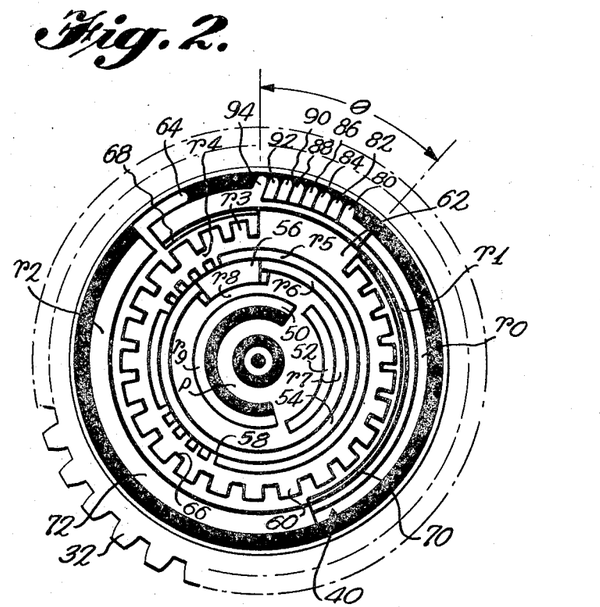
FIG. 2 is an enlarged view of the output gear illustrated in FIG. 1 more clearly showing the control ring pattern on the gear.

Referring to FIG. 2, the control ring pattern on the face of the output gear 32 is shown in complete detail. The control rings are made of copper and can be formed on the gear in several different ways. For example, they can be printed on a suitable backing such as a board material of epoxy-glass, or a phenolic paper. The latter is less expensive and can be used even though it is flexible since the output gear 32 will provide the necessary rigid backing. If desired a layer of copper can be cemented directly to the face of the gear by a non-conductive adhesive material, and the control ring pattern etched or printed directly on the gear. By using a thermo-softening material the gear could be warmed and the copper could be pressed flush with the surface of the gear to minimize contact finger wear at the gaps in the rings. Also the copper rings could be die cut from a relatively thick sheet of copper and stamped or pressed into an insulating material.

In addition to the rings $r0$–$r9$, a power ring P is provided at the center of the card which is slidably engaged by suitable brush contact (not shown) to connect the power ring P to the negative terminal of the vehicle battery. A portion of the power ring P extends outwardly and forms arcuate portions of the rings $r7$–$r9$. Therefore, when the contact fingers $f7$–$f9$ engage these portions of the respective rings, they will be connected to the negative terminal of the battery.

An arcuate segment 50 of copper forms a portion of ring $r9$ and is electrically isolated from the remainder of ring $r9$ and the remainder of the control ring pattern. The purpose of the arcuate segment 50 is to enable the contact finger $f9$ to ride on copper when it is travelling over this portion of ring $r9$ rather than riding on a plastic material which might be wiped on to the other arcuate portion of ring $r9$ and impair the electrical connection between this portion of the ring and the finger $f9$. The copper arcuate segment 50 also improves the wear roller characteristics.

Similar arcuate segments 52 and 54 are provided on the rings $r8$ and $r6$ respectively. A short, electrically isolated arcuate segment 65 interrupts rings $r6$ and $r7$ so as to electrically interconnect the fingers $f5$ and $f6$ when they engage this arcuate segment, as will be described hereinafter.

Ring $r4$ is a complete ring which is maintained at ground potential by the contact finger $f4$, as will be described. The ring $r5$ is formed by two groups of fingers 58 (five fingers per group) which project inwardly from the ring $r4$. The remainder of the copper material forming ring $r5$ is electrically isolated and provided for wear purposes. The ring $r3$ is formed by a plurality of fingers 60 which project radially outward from the ring $r4$ and fingers 66 which project inwardly from the ring $r2$. It will be observed that the ring $r4$ also has a projecting arcuate segment 62 which forms a portion of the rings $r2$ and $r3$. The arcuate segment 62 also defines the portion of the control ring pattern hereinafter referred to as the $\theta$ region. When the contact fingers $f2$–$f4$ slidably engage the arcuate segment 62 they are shorted together and are all at ground potential since the contact finger $f4$ is connected to ground as previously mentioned.

An extension 64 of the ring $r2$ is connected to the power ring P so that the ring $r2$ and the radially inward projecting fingers 66 which form part of the ring $r3$ are always connected to the negative terminal of the battery. Therefore, as the contact finger $f3$ rides on the ring $r3$ it is connected alternately to ground when it engages a finger 60 and to the negative terminal of the battery when it engages one of the fingers 66. Electrically isolated arcuate segments 68 and 70 are also provided on the ring r2 for wear purposes. When the finger f2 rides on one of these arcuate segments it is not connected to the negative terminal of the battery. However the fingers 66 adjacent thereto still are connected to the negative terminal.

A portion of the rings r0 and r1 is formed by an arcuate segment 72 that spans rings r0 and r1 so that the contact fingers f0 and f1 are shorted together when they slidably engage this arcuate segment. The ring r0 has eight arcuate segments 80–94 having radially projecting tabs. The tabs are electrically interconnected by resistors 81–93 (FIG. 3) which rotate with the control ring pattern on the output gear 32. The arcuate segments 80 and 94 are elongated and the arcuate segment 94 spans rings r0 and r1 as does the arcuate segment 72.

Figures 3, 4:
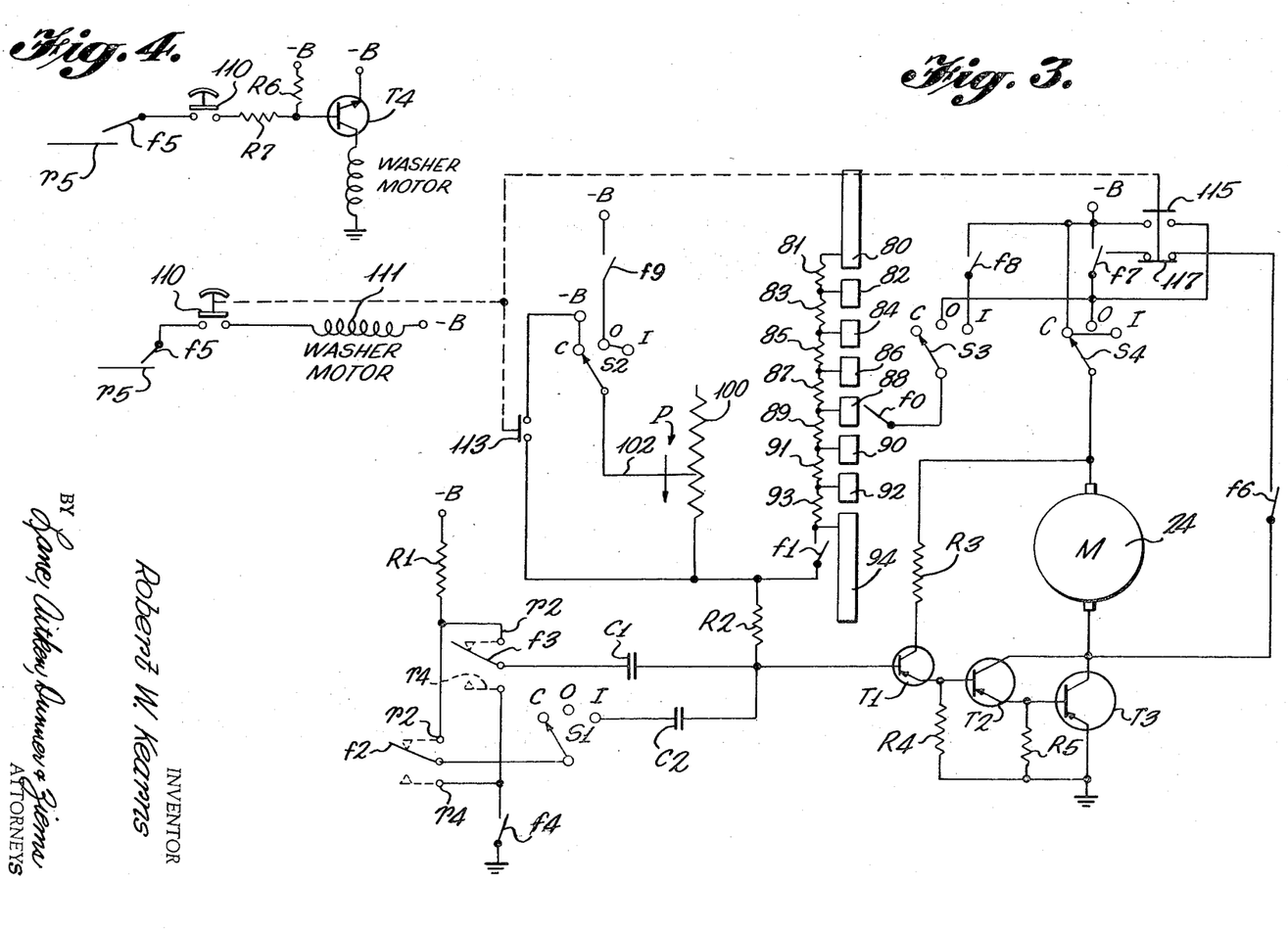
FIG. 3 is a schematic circuit diagram illustrating one embodiment of the invention.
FIG. 4 is a schematic circuit diagram illustrating another embodiment of the windshield washer control.

Referring to FIG. 3 a complete schematic circuit diagram of the control device of the present invention is illustrated and will now be described in detail. The various contact fingers f0–f9 are each indicated schematically as switches and the four switch sections of a dashboard control switch 168 (FIG. 10) are shown as three position switches S1–S4. As illustrated in FIG. 3, the movable contacts of each of the switch sections is engaged with the extreme left hand contact C. When the driver turns the dashboard control switch to this position the wiper blades will be operated continuously, as will be described. The middle contact O of each of the switch sections is the off position and in this position the wiper blades will be stopped automatically when they reach the park position as will be described. When the movable contact of each of the switch sections is turned to the extreme right hand contact I, the windshield wiper blades will be operated intermittently as will be described.

The control device includes three transistors T1, T2 and T3 connected together to act as one transistor. By using three transistors rather than one or two, the circuitry will remain cool even when the motor draws stall current, and the additional gain provided results in a quicker switching action, makes the circuit more efficient, and enables the transistors to run cooler so that a smaller heat sink can be used. The electric windshield wiper motor 24 is connected in series with the emitter-collector circuit of the transistor T3. The emitter is connected to ground and the other side of the motor to the movable contact of the switch section S4.

The contacts C and I of the switch section S4 are connected directly to the negative terminal −B of the battery, and the contact O is connected to the negative terminal of the battery through the contact finger f7. The motor 24 and switch section S4 are shunted by a circuit including the contact fingers f6 and f7 which are shorted together when the contact fingers engage the short arcuate segment 56 which spans both of the rings r6 and r7. This immediately brakes the motor to a stop as will be described in greater detail hereinafter.

The arcuate segments 80–94 are illustrated schematically in FIG. 3 adjacent to the contact finger f0 which slidably engages these segments. The resistors 81–93 interconnecting the tabs projecting from these segments are also shown. The entire string of series connected resistors 81–93 is switched in and out of the circuit by the contact finger f1. The arcuate segments 80 and 94 are illustrated as being longer than the remaining segments since they are longer on the control ring pattern as previously mentioned. The remaining components of the circuit are capacitors C1 and C2, a potentiometer P having a resistance element 100 and a wiper arm 102, and fixed resistances R1–R5.

When the driver of the vehicle turns the dashboard control switch to the continuous position to operate the wiper blades continuously, the movable contact of each of the switch sections S1–S4 is shifted to the contact C as illustrated. In this position the base circuit of the transistor T1 is connected to the −B potential through the fixed resistor R2, the potentiometer P and the contact C of the switch section S2. When the transistors are turned ON full current is delivered to the motor 24. As the control ring pattern rotates with the output gear 32, the contact finger f3 alternatively engages the projections 60 projecting from the ring r4 and the projections 66 projecting from the ring r2. Since the ring r4 is uninterrupted and the contact finger f4 is connected to ground, the contact finger f3 will be connected to ground when it engages a projection 60. Since the ring r2 is connected to the power ring P1 (FIG. 2) as previously described, the finger f3 will be connected to the −B potential each time it engages a projection 66. This forms the fictitious switch illustrated wherein the contact finger f3 will cycle 24 times per revolution of the control ring pattern. Since the output gear 32 rotates once for each complete wiping cycle of the wiper blades (a complete cycle comprising an upstroke and a return stroke), the contact finger f3 cycles 24 times per wiping cycle.

When the contact finger f3 is connected to the −B potential through the ring r2, the capacitor C1 charges and the transistors are even more ON since another path is provided between the base of the transistor T1 and the −B potential in addition to the path through the resistor R2 and potentiometer P. When the contact finger f3 is connected to ground through ring r4, a positive potential is imposed on the base of the transistor T1. This is so because the charge on the capacitor C1 cannot change instantaneously. Therefore, when the negative side of the capacitor is raised from −B to ground, the positive side is raised the same amount. This biases the transistors OFF and de-energizers the motor 24. The capacitor C1 discharges through the fixed resistor R2, the potentiometer P and the switch section S2. When the potential on the base of the transistor T1 again becomes negative the transistors turn back ON to again energize the motor.

Then contact finger f3 switches back to the ring r2, the transistors will be turned ON immediately, even though the capacitor C1 has not discharged sufficiently to turn them ON. In this manner the motor will be pulsed on and off as the contact finger f3 passes over the ring r3 and alternately engages the projections 60 and 66 connected to the rings r4 and r2, respectively. The rate at which the capacitor C1 discharges when the contact finger f3 is connected to the ring r4 is determined by the position of the wiper arm 102 of the potentiometer P, this position in turn, is controlled by a suitable knob on the dashboard control switch, as will be described. When the wiper arm 102 cuts out the resistor element 100, the motor remains on for a greater percentage of time each pulsing cycle, and therefore, the motor operates the wiper blades at their maximum speed. When the wiper arm 102 cuts in the entire resistor element 100, the motor operates the wiper blades at their lowest speed. The motor speed will adjust itself to just about give the capacitor C1 time to discharge sufficiently to turn the transistors ON. If the motor starts to slow down due to increased drag on the wiper blades, the transistors will turn back on before the contact finger f3 switches back to the ring r2. This automatically increases the percentage of ON time of each pulsing cycle to resist slowing down of the motor and maintain constant motor speed.

When the operator actuates the dash board control switch 158 to turn the wiper blades off, the movable contact arms of each of the switch sections S1–S4 are moved to the middle contact O. In this position the motor is connected to the −B potential through the contact finger f7, and the contact finger f0 is connected to the −B potential through the contact finger f7. If the contact fingers f0 and f1 are engaged with the arcuate segment 72 when the dashboard control switch is turned off, they are connected together and complete the circuit from the base of the transistor T1, through the contact finger f7 to the −B potential.

When the contact fingers $f0$ and $f1$ leave the arcuate segment 72, the contact finger $f9$ connects the contact 0 of the switch section S2 to the $-B$ potential to connect the potentiometer P back into the circuit. Therefore the electric motor 24 continues to pulse on and off at a speed determined by the position of the wiper arm 102.

When the wiper blades near the park position at the end of the return stroke, the contact finger $f0$ engages segment 80 just before the contact finger $f9$ opens, and then the contact finger $f7$ opens to disconnect the resistor R3 from the $-B$ potential. This turns off the motor 24 because the contact finger $f3$ is connected to ground through the arcuate segment 62. At this point the unit will dwell or continue to move by virtue of its kinetic energy when it arrives a few degrees thereafter, the contact fingers $f6$ and $f7$ engage the short arcuate segment 56 to close the shunt path around the motor 24 which immediately brakes the motor to a stop at the park position. The blades will remain at the park position and the transistors will remain OFF and the motor de-energized and shunted.

When the driver turns the dashboard control switch to select the intermittent mode of operation, the movable contact arm of each of the switch sections S1–S4 engages the contact I of each of the switch sections. This connects the capacitor C2 into the circuit through the fictitious switch provided by the finger $f2$ and the rings $r2$ and $r4$, the contact finger $f0$ into the circuit through the contact finger $f8$, and the potentiometer P into the circuit through the contact finger $f9$. Therefore, transistors will immediately be turned ON to energize the motor 24 and start the wiper blades.

Assuming, for example, that the wiper blades started from the park position wherein the contact fingers $f6$ and $f7$ are on the short arcuate segment 56, the contact finger $f8$ would be closed, and the contact fingers $f0$ and $f1$ would be connected to the double width portion of the arcuate segment so as to be connected together. Since this completes the circuit from the $-B$ potential to the base of the transistor T1 through the resistor R2, the transistors are immediately turned ON to energize the motor.

The capacitor C1 alternately charges and discharges as previously described to turn the transistors ON and OFF to pulse the motor as previously described. The fingers $f0$ and $f1$ will remain connected together throughout the entire upstroke and for the beginning of the return stroke since the arcuate segment 72 extends beyond the turn around point of the wiper blades. As long as the fingers $f0$ and $f1$ are connected together, the capacitor C1 will discharge very rapidly, and therefore, the motor will be pulsed at its maximum speed as previously mentioned. This provides substantially full torque during the entire upstroke of the wiper blades, and is a desirable feature for overcoming high starting drag due, for example, to snow, ice or dirt on the windshield which might increase the drag on the wiper blades.

While the contact fingers $f0$ and $f1$ are on the double width portion of the segment 94, the contact finger $f2$ is on the segment 68, and therefore, is not engaged with either the ring $r2$ or $r4$. This avoids charging capacitor C1 and thereby turning on the transistors at the time the motor is shorted when the dash board switch is in the OFF position. As soon as the contact fingers $f0$ and $f1$ leave the segment 94, the contact finger $f2$ is connected to $-B$ potential by the ring $r2$ to charge the capacitor C2 until the contact finger $f2$ is again electrically isolated so that it does not engage either the ring $r2$ or $r4$, and at substantially the same time, the contact finger $f9$ closes and the contact finger $f8$ opens. Therefore, during this portion of the return stroke as the wiper blades approach the $\theta$ region, the motor is pulsed on and off to operate at a speed determined by the position of the wiper arm 102 of the potentiometer P.

As the wiper blades enter the $\theta$ region at the end of the return stroke, the contact finger $f8$ closes and the contact finger $f2$ is connected to ground through the segment 62. The latter connects the capacitor C2 back in the circuit which immediately turns the transistors OFF by making the base of the transistor T1 positive. The capacitor C2 is much larger than the capacitor C1 and maintains the transistors OFF for a longer period of time. Further, since the contact finger $f0$ is connected to the segment 80 and the contact finger $f1$ to the segment 94 all the resistors 81–93 are connected in series with the fixed resistor R2. Still further, just after the contact finger $f8$ closes the contact finger $f9$ opens to break the circuit to the potentiometer P. Therefore, the capacitor C2 discharges slowly through the high resistance path provided by the resistors 81–93 to maintain the transistors OFF for a period of time which depends on the RC time constant provided by the capacitor C2 and the resistors. This time can be varied from near zero to fifteen or twenty seconds as will described.

When the motor 24 is turned off as just described, the windshield wiper blades coast into the $\theta$ region. If the sample of moisture in the $\theta$ region of the windshield is low in moisture so that the drag on the wiper blades in the $\theta$ region is high, the wiper blades will stop soon after they enter the $\theta$ region. Assuming they stop with the contact finger $f0$ engaging the segment 80, the wiper blades will dwell for the maximum dwell period just described because all of the resistors 81–93 will be connected in the circuit. When the capacitor C2 has discharged to remove the positive potential from the base T1, the transistors turn back ON to start the next wiping cycle.

The wetter the moisture sample in the $\theta$ region of the windshield the further into the $\theta$ region the wiper blades coast before coming to a stop with the contact finger $f0$ on one of the segments 80–92. The segment on which the finger $f0$ stops will determine the number of resistors 81–93 connected in series with the fixed resistor R2 so as to vary automatically the length of time the capacitor C2 takes to discharge and thus vary automatically the dwell period at the end of each wiping cycle.

It is further apparent that the dwell period at the end of each wiping cycle will decrease as the wiper blades coast further into the $\theta$ region. This is exactly what is desired. The wetter the windshield the shorter the dwell period and the drier the windshield the longer the dwell period. Stated otherwise, the wetter the windshield the more wiping cycles per unit time during the intermittent mode of operation and the drier the windshield the fewer wiping cycles per unit time.

In the event a sudden heavy rain or road spray from a passing vehicle makes the windshield very wet, the wiper blades will coast through the $\theta$ region without stopping so that the contact finger $f2$ disconnects the capacitor C2 from the circuit and the motor is automatically re-energized for another wiping cycle.

By varying the position of the wiper arm 102 on the potentiometer P during the intermittent mode of operation, the speed of the wiper blades on the return stroke of the wiping cycle can be adjusted. By slowing the motor down on the return stroke, the kinetic energy of the wiper blades is reduced as they enter the $\theta$ region and the blades are more likely to stop. By increasing the speed of the wiper blades on the return stroke the kinetic energy is increased and the blades are more likely to skip the dwell period.

It is noted that the contact fingers $f0$ and $f1$ are disconnected from the circuit when the movable contact arms of the switch sections are moved to the contact C for the continuous mode of operation. Consequently, in the continuous mode of operation the motor will be pulsed on the entire upstroke at a speed determined by the position of the wiper arm 102. In the $\theta$ region the contact finger $f3$ will remain connected to ground through the ring $r4$ so that the capacitor C1 will not be recharged after it is discharged. Therefore, when the capacitor C1 discharges in response to the contact finger $f3$ engaging the arcuate segment 62, the transistors will turn ON and remain ON through the remainder of the θ region. The fact that the motor is not pulsed in the θ region provides more power and a quick turn around at the park position in the continuous mode of operation which is desirable.

Also, it will be observed in FIG. 2 that the projections 66 of ring r2 widen as the wiper blades reach the turn around point at the end of the up stroke and become narrower as the wiper blades approach the θ region. This provides more power to the motor as the wiper blades pass through the turn around point, and also minimizes variation in the park position of the blades when the wiper blades are turned off. As to the latter, by diminishing the amount of power provided to the motor on the return stroke, the motor is deliberately slowed down. Thus the system possesses substantially the same small amount of energy each time the blades enter the θ region. This enhances the accuracy of the comparison between the sample of moisture on the windshield in the θ region and the kinetic energy of the system as the blades enter the θ region, as will be described in greater detail hereinafter. Automotive engineers spend a great deal of time compromising the difference between the dry wipe pattern and the wet wipe pattern produced by conventional windshield wiper controls. On a wet glass the blades run faster and have more momentum, hence the wipe pattern is larger than on dry glass. Also on dry glass there is more friction and the arms of the blade bend to further reduce the wipe pattern.

By changing the pulsing of the motor at the wiper blade turn around points, in combination with the speed control feature (i.e., if wiper blades tend to go too fast power input is automatically reduced and vice versa), the control device of the present invention provides substantial identical wiper patterns on wet or dry windshields. This is an important advantage since the difference between the wipe patterns produced by prior art wiper control devices is one of the reasons behind the need for a depressed part feature. By substantially eliminating the difference between the wet-dry wipe patterns, the turn around point of the wiper blades at the park position can be positioned as close to the reveal moulding at the bottom of the windshield as manufacturing tolerances will permit. Thus when the wiper blades are parked in accordance with the present invention by turning the control device to the off position, they will be parked so near to the reveal moulding that the conventional depressed part feature is not necessary. However, if desired the depressed part feature could be added to the control device of the present invention by simply having the direction of operation of the motor reversed when the control is turned to the off position. Certain rings can be assigned this function and the reversal of the direction of the motor can be used to actuate a linkage arrangement of the type used in depressed park arrangements to lengthen the linkage and thereby increase the travel of the wiper blades on the return stroke.

If desired the segments 80–94 and the resistors 81–93 connected therebetween could be replaced by an arcuate segment made from carbon deposited directly on the ring r0 to provide the resistance element of a potentiometer. The contact finger f0 would then act as the wiper arm. The position at which the contact finger f0 stopped on the carbon arcuate segment would determine the resistance connected in series with the fixed resistor R2 which, in turn, would determine the length of the dwell period at the end of each wiping cycle in the intermittent mode of operation.

In the control circuit just described the various electrical components have the following exemplary values; resistor R1—82 ohms, R2—390 ohms, R3—220 ohms, R4—56 ohms, R5—5.6 ohms, C1—3 microfarads, C2—1,000 microfarads, potentiometer P—10 kilohms, resistor 81—2.7 kilohms, resistor 83—1.8K, resistor 85—1.5K, resistor 87—1.2K, resistor 89—1K, resistor 91—.680K and resistor 93—.470K. Transistor T3 is a 2N441 transistor designed to carry 15 amps, transistor T2 a 2N554 and transistor T1 a 2N1303.

Figure 10:
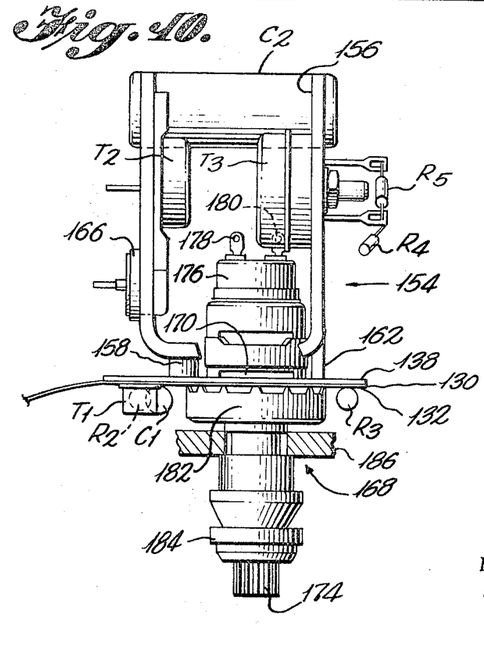
FIG. 10 is an elevational view of the dashboard mounted control unit of the control device of the present invention.
Figure 11:
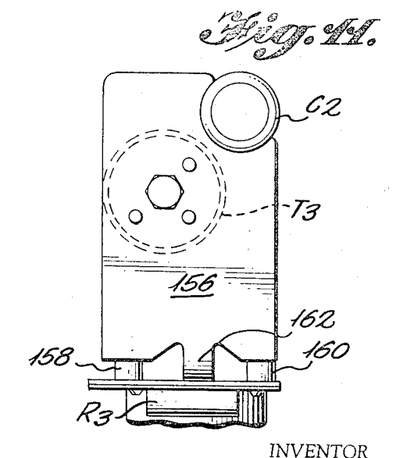
FIG. 11 is a view of one side of the control unit illustrated in FIG. 10.

The circuit for controlling the windshield washer unit is shown in the upper left hand corner of FIG. 3. The washer motor coil 111 is connected in series with a washer switch 110 and the contact finger f5. The washer switch 110 is actuated by pushing on the knurled knob 174 which forms part of the dashboard mounted control switch as illustrated in FIG. 10. When the washer switch 110 is closed switches 113, 115 and 117 are simultaneously closed therewith start the wiper blades in motion. When the contact finger f5 engages each of the individual projections 58 of the two sets of projections on the ring r5, the washer circuit is completed to ground to energize the washer motor and squirt water on the windshield at the centerline of each wipe pattern. The first set of projections 58 pulse the washer motor five times and the second set also pulses the washer motor five times. However, the two sets of projections 58 are positioned to squirt the water near the beginning of the upstroke and near the end of the upstroke. With this arrangement water will not be squirted on the windshield when the wiper blades are near the centerline of the wipe patterns on the upstroke. No water is squirted on the windshield during the downstroke. This provides on the upstroke a "machine gun bullets through the propeller" effect so that wiper blades do not strike the water being squirted in a manner to throw off the water before it is deposited on the windshield. When the wiper blades hit the water being squirted, the water thrown off is simply wasted. As soon as the washer switch 110 opens, the wiper blades will complete the wiping cycle in progress, or a number of cycles, depending on the degree of dryness of the windshield, and automatically stop at the park position at the end of a wiping cycle, as previously described. A similar arrangement could be used for concentrated de-icer to remove ice automatically, and for a cleansing agent other than water so the driver can select his own mix formula for cleaning the windshield. The bursts, in combination with their sequence position control uses the fluid economically.

Figure 5:
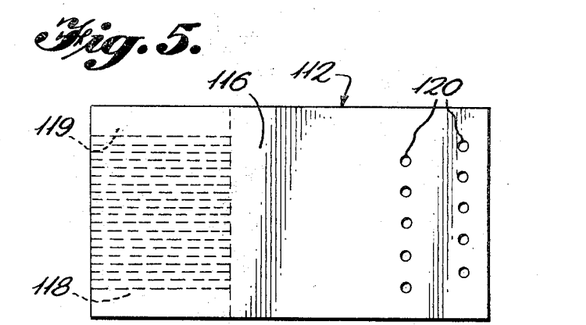
FIGS. 5–9 are enlarged views of the comb and contact fingers illustrated in FIG. 1.

Referring to FIG. 5 another embodiment of the windshield washer control is illustrated which employs a transistor T4 to reduce the amount of current passing through the contact finger f5 and the ring r5. When the washer switch 110 is closed, current flows from ground into the base of the transistor each time the contact finger f5 engages a projection 58. This turns the transistor ON and OFF and pulses the wiper motor coil 111 connected in series with the emitter-collector circuit of the transistor. When the washer motor is off, leakage current tends to flow from ground through the washer motor and out the transistor base. The purpose of the resistor R6 is to control this leakage current with temperature so that the transistor remains off when the circuit to ground is broken.

The transistor T4 is shown as an npn transistor since this allows the transistor and resistors R6 and R7 to be eliminated and the circuit converted to that shown in FIG. 4 without changing voltage polarities. If the voltage polarities are changed, a pnp transistor could be used.

Figure 6:
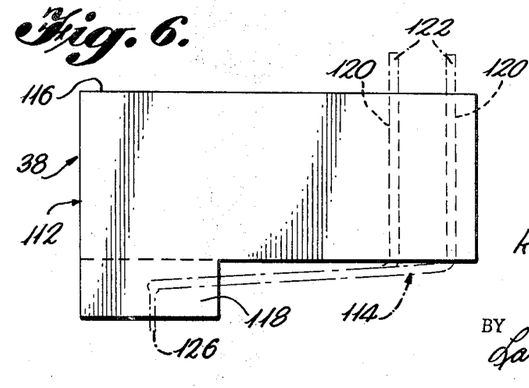
Figure 7:
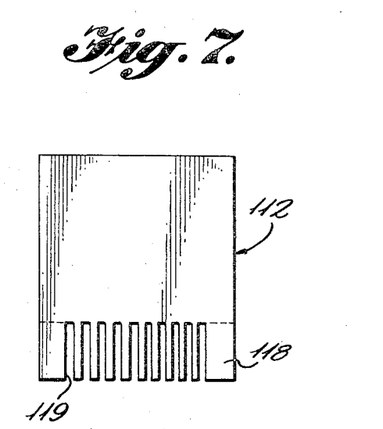

Referring to FIGS. 6–10, the construction of the comb 112 and contact finger 114 of the comb and contact fingers assembly 38 (FIG. 1) is shown in greater detail. The comb 112 comprises a body 116 having a lug 118 projecting from one end of the bottom thereof. The lug 118 is provided with ten slots 119 for receiving and positioning contact fingers 114 corresponding to each of the contact fingers f0–f9. The spacing of the slots is best illustrated in FIG. 7 and is such as to accurately align the projecting end of the contact finger with the ring it is to engage.

The other end of the comb body 116 is provided with two rows of staggered holes 120, one for each of the contact fingers.

Figure 8:
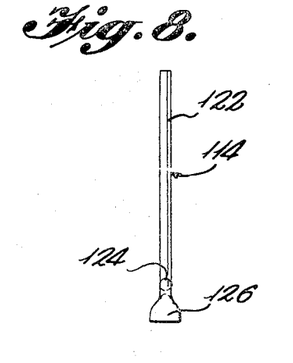
Figure 9:
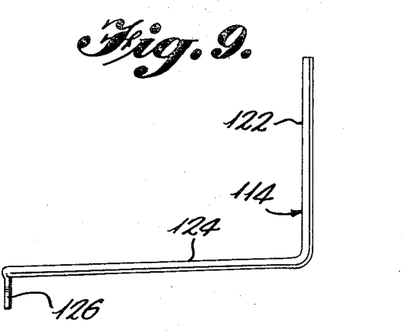

Referring to FIGS. 8 and 9 each of the contact fingers 114 comprise an elongated end portion 122, a substantially right angle middle portion 124 and a projecting end portion 126. The elongated end portion 122 of each of the contact fingers extends through one of the holes 120 while the middle portion 124 of each contact finger is guided and received in one of the slots 119 aligned with the hole. The projecting end 126 of each of the contact fingers projects from the lug 118 so as to resiliently engage its control ring. The elongated end portion 122 of each of the contact fingers is slightly longer than the hole 120 through which it extends so as to project slightly above the body 116 to facilitate electrical connection to the end 46 of the flexible printed cable 36 (FIG. 1). The contact fingers are staggered as shown because of the close spacing of the rings f0–f9 required by the small output gear 32. This provides enough room to get printed circuit tabs around the end portions 122 of the fingers. If the rings were wider, a number of wires could be arranged to make up each contact finger. In this way during the bouncing of one wire, another would remain in contact with the ring.

The flexible printed cable 36 is more clearly illustrated in FIG. 12. It will be seen that the end 46 has ten printed paths thereon terminating in position to fit over the ends of the end portion 122 of the contact fingers and make the necessary electrical connection thereto. The other end of the flexible printed cable terminates in an enlarged rectangular end portion 130 having a printed circuit 134 printed on the face 132 of the rectangular end portion 130. The printed circuit 134 co-operates with the dashboard control switch 168, as will be described, to provide the switching action represented in FIG. 3 by the switch sections S1–S4. In addition, the fixed resistors R2 and R3, the capacitor C1 and the transistor T1 are mounted on the face 132 and connected to the printed circuit 134. Two holes 134 and 136 are formed in the rectangular end portion 130 for mounting purposes, as will be described.

Figure 13:
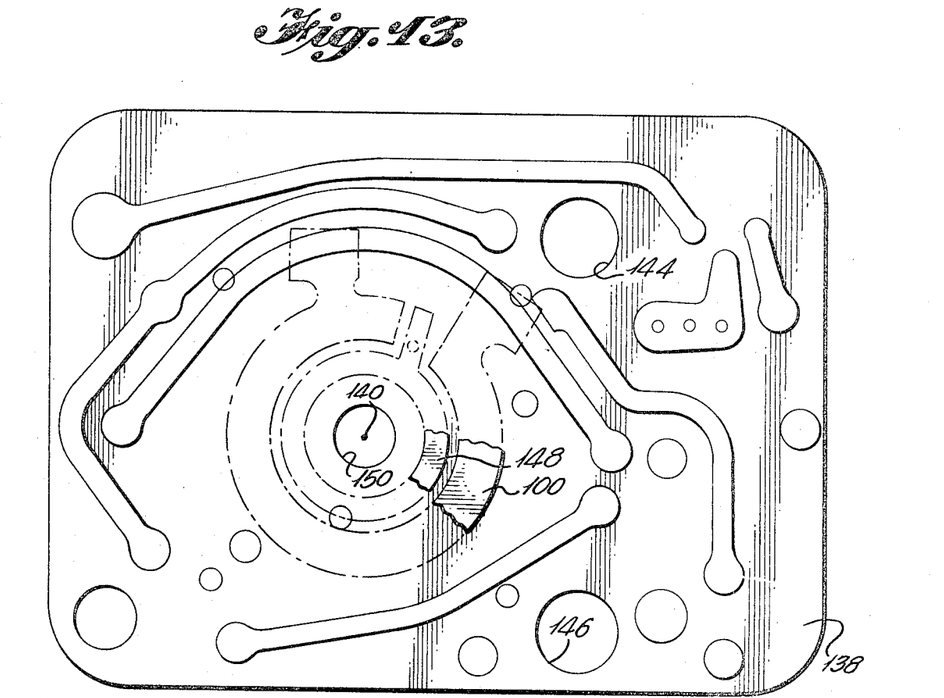
FIG. 13 is a plan view of a printed circuit board which is bonded on the back face of the enlarged end of the flexible printed cable.

Referring to FIG. 13, a relatively stiff printed circuit board 138 is illustrated which is bonded to the back face of the rectangular end portion 130. The board 138 has a printed circuit 140 on one face thereof to co-operate with the printed circuit 134 on the rectangular end portion to make a two sided printed circuit board at the dashboard control switch. The printed circuit board 130 is positioned so that a hole 150 therein coincides with a hole 152 in the rectangular end portion 130. Through holes 144 and 146 also are provided in the printed circuit board 138 which align with the through holes 134 and 136 in the rectangular end portion 130. A carbon resistance element 100 is bonded to the printed circuit board 138 concentric with the center of the hole 150. This is the resistor element 100 of the potentiometer P illustrated in FIG. 3. A wiper contact ring 148 of conductive material is fixed to the board within the resistance element 100. The lug projecting from the ring 148 is connected to the wiper contact of switch S2 directly on the other side of the board.

The dashboard control switch 168 contains the wiper contact element 102 which slidably engages the wiper contact ring 148 and the resistor element 100 and is rotated relative thereto by the knurled knob 174 of the dashboard control switch to vary the portion of the resistor element 100 connected to the resistor R2 as described in connection with FIG. 3.

Referring to FIGS. 10–14, the dashboard control unit 154 comprises a U shaped mounting bracket 156 which is mounted on the printed circuit board 138. A pair of spacers 158 and 160 are provided for spacing the U shaped bracket from the printed circuit board 138 and a tab 162 is struck from one side of the U shaped bracket to engage the printed circiut 140 on the board 138. The insulating material of the printed circuit board 138 insulates the U shaped bracket and the components mounted thereon from the dashboard.

The transistors T2 and T3 are mounted on the legs of the U shaped bracket as shown, and the bracket provides a common collector connection between the two transistors. The resistors R4 and R5 are connected as shown to terminals projecting from one of the legs, and the large capacitor C2 is supported between the legs of the U shaped bracket. The transistor T1, capacitor C1, resistor R2 and resistor R3 are mounted on and connected to the printed circuit 134 on the rectangular end portion 130 of the flexible printed cable as previously described. An optional diode 166 also may be mounted on one of the legs of the U shaped bracket to minimize noise as will be described hereinafter.

And finally the dashboard control unit 154 includes the dashboard control switch 168 having a control shaft (not shown) extending freely through the aligned holes 150 and 152 in the printed circuit board and the rectangular end portion 130 of the flexible printed cable. Portions of the dash board control switch are clamped on opposite sides of the printed circiut board 138. The portion of the dashboard control switch which projects into the U shaped bracket includes a cup shaped element 170 for housing the wiper contact unit 102 (FIG. 3) which makes the electrical connection between the wiper contact ring 148 (FIG. 13) and the resistor element 100 on the printed circuit board 138. The wiper contact unit 102 is rotated by the knurled knob 174 which, pushed inwardly by the operator, closes the washer switch 110 (FIG. 3) to energize the washer motor. The washer switch 110 is physically housed in the switch housing 176 on the end of the dashboard control switch 168. Two terminals 178 and 180 project from the housing 176 for making the necessary electrical connection to the switch 110 within the housing.

The rotatable contacts of the dashboard control switch 168 which co-operate with the printed circuit 134 on the face 132 of the flexible printed cable to form the switch sections S1–S4 (FIG. 3) are housed in a cup shaped housing 182 which is clamped against the face 132. The rotatable contacts are rotated to the continuous, off and intermittent positions previously described by rotating the ring 184 surrounding the knurled knob 174. A fragmentary portion of the dashboard panel 186 of the vehicle is shown to illustrate the manner in which the dashboard control switch 168 is clamped to the dashboard panel 186 to retain the entire control unit 154 in position.

When the control device of the present invention is used with other types of conventional windshield wiper motor units having larger output gears, the control ring pattern, illustrated in FIG. 2 can be enlarged to increase the width and spacing of the rings. When this is possible, the rings also can be spaced evenly to enable the contact finger construction illustrated in FIGS. 14 and 15 to be employed. These contact fingers are formed from a long continuous strip of material. A portion of the strip is cut to form a contact section 190 as illustrated in FIG. 15.

The section 190 has ten evenly spaced, equal width, contact fingers corresponding to the contact fingers f0–f9. The fingers are joined together at one end to enable the sections 190 to be formed from a single long slotted strip and to simplify handling the fingers during assembly, as will be described. Each of the fingers is provided with a terminal hole 192 for making the necessary electrical connections to the individual fingers. The contact section 190 is clamped in a block of insulating material 194 shown in phantom in FIG. 15. The block 194 is fixed on the inside of the cover plate 34 as illustrated in FIG. 1. A hole 196 is provided in the block which is aligned with a suitable grommet hole provided in the coverplate for making the necessary electrical connections to the individual fingers at the holes 192 therein.

After the contact section 190 is firmly clamped in the block 194 as illustrated in FIG. 15, the uninterrupted end of the contact section 190 can be cut to electrically isolate the fingers from one another. The portion of the block 194 through which the fingers extend can be formed with grooves to precisely located each contact finger and firmly clamp it in position. The contact section 190 preferably is made of beryllium copper, and the contact tip 198 of each of the fingers is preferably rhodium plated. The contact fingers 114 used with the comb and contact finger assembly 38 (see FIG. 1 and FIGS. 9 and 10) also are made of beryllium copper. Further for each set of ten contact fingers 114 one of the contact fingers may be peened as illustrated in FIGS. 9 and 10 to provide improved slide wear resistance. This would be the contact finger $f3$ which controls the pulsing of the electric motor. Of course, the projecting ends of the other contact fingers 114 also could be peened to improve wear, but the contact finger $f3$ of each comb and contact finger assembly 38 is the most important.

Referring to FIG. 16, another modification of the comb and contact finger assembly is illustrated. In this embodiment one end of a comb 200 is rotatably connected to the output shaft 202 of the output gear 204 having the control rings thereon. The contact fingers are supported by the comb 200 in a suitable manner with the terminal end 206 thereof projecting from the comb to facilitate the necessary electrical connection to the contact fingers. As in the previous embodiments, the other ends of the contact fingers slidably engage the control rings on the face of the output gear 204 and are positioned accurately by the comb. A suitable slot 208 may be provided in the motor housing for engaging a projection 210 on the end of the comb, to lock the comb against rotation with the output shaft 202.

This construction eliminates the tolerance build up that might occur in some of the embodiments previously described because the control rings and comb are related to the same reference, namely the output shaft 202.

For example, in the embodiment of FIG. 1 the following tolerances were involved; tolerance of comb 38 to cover 34, cover 34 to the bolt holes in the cover, tolerance of bolt holes in the motor frame to the location of the output gear shaft, and tolerance from the output gear shaft to the control rings. The comb is important for controlling the contact fingers so that they track properly on the control rings with the contact finger tips position controlled. This control is enhanced by the elimination of tolerance build up provided by the embodiment of FIG. 16, wherein the control rings and contact finger assembly are related to the same references.

Another important feature of the control device of the present invention is the speed control it provides during the entire wiping cycle. On the upstroke of the wiping cycle the wiper blades are preferably operated at slightly less than maximum speed and on the return stroke at a reduced controlled speed. If the wiper blades try to slow down, due to increased drag on the windshield, the speed control of the present invention automatically increases power to compensate for the increased drag. This tends to maintain the speed in accordance with the pre-determined program established by the control ring pattern.

The importance of this perhaps can be explained by the following hypothetical example. If an ideal constant speed control were available which automatically maintained the same constant speed regardless of the degree of moisture on the windshield, each wiping cycle would take the same amount of time. Therefore, the kinetic energy of the wiper blades as they enter the $\theta$ region would be precisely the same each time. However, an ideal speed control still cannot respond perfectly to all inputs. If there were a sudden increase in load-torque, then the speed of an ideal control would slow down momentarily.

One reason automatic control has not heretobefore been physically realized is that it cannot foretell the future. If it could foretell the future it would ready itself for the onslaught of sudden change. However, the basic principle which is recognized by the programmed speed control of the present invention is that to a large extent the future is known. It is known that the wiper blade motor is cyclic. It is known exactly where the wiper blades are in each cycle. It is known (or can be measured ahead of time for a particular windshield glass or shape of glass), the load-torque under varying windshield conditions, and the control device of the present invention knows (senses) the water to which the windshield glass is exposed at any particular moment.

Therefore, in a very real sense the control device of the present invention knows the future, and the dynamic errors can be predicted ahead of time. The control ring pattern can be skilfully varied arranged in the light of this information to compensate for the errors that we know the speed control of the present invention will make under varying conditions.

In short, the programmed speed control device compensates for the predictable dynamic errors of the windshield wiper system by controlling the dimensions of the arcuate segments of the various control rings, and this can be done without increasing the cost of the control ring card. Looked at in another way, the control ring card is equivalent to a player piano and all that is needed is for the windshield wiper engineers to write the music.

With the control ring pattern shown in FIG. 2, and in particular the arcuate segments in ring $r3$, the wiper blades will be operated at slightly less than maximum speed on the upstroke, increased speed at the turn around point, and a reduced controlled speed during the return stroke of the wiper blades with a further reduction in speed just before the wiper blades enter the $\theta$ region. If the wiper blades try to slow down in response to increased drag on the windshield during a wiping cycle, the speed control automatically increases the input power to compensate for the tendency to slow down. Thus, the difference in time between wiping cycles over wet and dry glass is substantially the same or at least reduced to a minimum. Also because of this, the size of the wipe patterns of wiping cycles over wet and dry glass is substantially the same.

By controlling the speed of the wiper blades as they enter the $\theta$ region, as described above, the kinetic energy of the windshield wiping system is substantially the same small precise amount each wiping cycle. Therefore, the decision made by the control device as to whether and where the wiper blades will stop in the $\theta$ region, or whether they will coast through the $\theta$ region, is primarily dependent upon the sample of moisture on the windshield in the $\theta$ region.

Since the entire windshield was wiped clean on the upstroke of the wiping cycle the sample of moisture in the $\theta$ region provides a very realistic indication of the actual weather at that particular time. This indication will not be significantly affected by the amount of moisture which has collected on the windshield during a prolonged dwell period between wiping cycles. This accumulated moisture is bad measure of the weather conditions at a particular point in time.

By using the speed control feature of the present invention to produce an upstroke total time which is more substantially constant and independent of moisture conditions, and by emphasizing a precise, constant, no-rate-of change velocity on the return stroke, coupled with low velocity at the line entering the $\theta$ region, the length of the dwell period between wiping cycles is determined primarily by the moisture sample deposited in the $\theta$ region after the beginning of the upstroke, and not by the amount of moisture which may have accumulated on the windshield during a dwell period.

When the velocity of the windshield wiping system is low at line entering the $\theta$ region, the kinetic energy is small and can be more accurately compared with the deceleration of the wiper blades in the $\theta$ region. This also enables the $\theta$ region to be made smaller which is desirable. The velocity at the line entering the $\theta$ region preferably should be constant and not further de-celerating so the reference is precise.

Thus with the control device of the present invention the actual weather is more nearly measured and the accurate speed control of the invention helps to achieve this objective.

What is claimed is:

1. In combination, a wiper motor unit for driving windshield wiper blades through repeating wiping cycles, and automatic control means for activating said wiper motor unit through repeating wiping cycles in a variable manner, said automatic control means comprising programmed means rotated by said wiper motor unit once for each complete wiping cycle, fixed read out means for reading out said programmed means, and electronic circuit means connected to said wiper motor unit and said read out means for activating said wiper motor unit in said variable manner in response to the program read out by said read out means.

2. The invention as defined in claim 1 wherein said read out means comprises a plurality of contact fingers electrically connected to said circuit means by a flexible printed cable.

3. The invention as defined in claim 2 wherein said circuit means includes control switch means connected to said flexible printed cable, the portion of said flexible printed cable connected to said control switch means having a printed circuit thereon which cooperates with the control switch means to produce the switching action for activating and de-activating the wiper motor unit.

4. The invention as defined in claim 3 wherein said portion of said flexible printed cable connected to said control switch means has a second printed circuit on the opposite face thereof, and wherein said circuit means includes electronic components electrically connected to said second printed circuit.

5. The invention as defined in claim 1 wherein said programmed means controls the speed of said wiper motor unit in a manner to minimize the difference between wet and dry wipe patterns and the difference in time between wiping cycles over wet and dry windshield conditions.

6. The invention as defined in claim 1 wherein said programmed means deenergizes said wiper motor unit during a $\theta$ region in each wiping cycle, and controls the speed of said wiper motor unit in a manner to cause the wiper blades to enter the $\theta$ region and a predetermined reduced speed which is substantially the same irrespective of the amount of moisture on the windshield.

7. In combination, a wiper motor unit for driving windshield wiper blades through repeating wiping cycles, and automatic control means for activating said wiper motor unit in a variable manner, said automatic control means comprising programmed means driven by said wiper motor unit, fixed read out means for reading out said programmed means, and electronic circuit means connected to said wiper motor unit and said read out means for activating said wiper motor unit is said variable manner in response to the program read out by said read out means, said programmed means being rotated once for each complete wiping cycle and being programmed to activate said wiper motor in an intermittent mode of operation with a dwell period at the end of each wiping cycle.

8. The invention as defined in claim 7 wherein each complete wiping cycle of the wiper blades comprises an outward and a return stroke.

9. The invention as defined in claim 8 wherein said programmed means pulses said wiper motor unit at substantially maximum speed on the upstroke of each wiping cycle and pulses the wiper motor unit at a controlled speed during the return stroke of the wiping cycle and de-activates said wiper motor unit in a $\theta$ region at the end of the return stroke, said circuit means including variable means for controlling the pulsing of the wiper motor unit during the return stroke to vary the speed of the wiper blades during the return stroke and thus vary the kinetic energy of the wiper blades as they enter the $\theta$ region.

10. The invention as defined in claim 9 wherein said programmed means includes means for automatically de-celerating the speed of the wiper motor unit on the return stroke for a given setting of said variable means.

11. The invention as defined in claim 7 wherein said programmed means is programmed to activate said wiper motor unit continuously, and wherein said circuit means includes switch means for selecting said continuous or intermittent modes of operation or an on off mode of operation.

12. The invention as defined in claim 11 wherein said wiper motor unit includes an output gear which rotates once for each complete wiping cycle, and wherein said programmed means comprises control ring means fixed on the face of said output gear, and wherein said read out means comprises a plurality of wiper contact fingers on said wiper motor unit in position to overlie said face of the output gear and slidably engage said control ring means.

13. The invention as defined in claim 12 wherein said read out means comprising a comb overlying said control ring means with one end of said comb rotatably connected to the output shaft of said output gear, means for locking said comb against rotation with said output shaft, and a plurality of wiper contact fingers supported and positioned by said comb to slidably engage said control ring means.

14. In combination, a wiper motor unit for driving windshield wiper blades through repeating wiping cycles, and automatic control means for activating said wiper motor unit in a variable manner, said automatic control means comprising programmed means driven by said wiper motor unit, fixed read out means for reading out said programmed means, and electronic circuit means connected to said wiper motor unit and said read out means for activating said wiper motor unit in said variable manner in response to the program read out by said read out means, said programmed means pulsing said wiper motor unit on and off when the wiper motor unit is activated, the wiper motor unit when pulsed operating continuously at a speed determined by the pulsing cycles.

15. The invention as defined in claim 12 wherein said programmed means comprises control ring means including a ring comprising a plurality of arcuate segments, alternate ones of said segments being connected to one potential and the remaining segments being connected to another potential in a manner to co-operate with said read out means to provide a switching action for pulsing the wiper motor unit on and off, the width of said arcuate segments at diametrically opposed points on said ring varying in thickness so as to automatically increase the speed of the wiper motor unit at said diametrically opposed points which correspond to the turn around points of each wiping cycle.

16. In combination, a wiper motor unit for driving windshield wiper blades through repeating wiping cycles, and automatic control means for activating said wiper motor unit in a variable manner, said automatic control means comprising programmed means driven by said wiper motor unit, fixed read out means for reading out said programmed means, and electronic circuit means connected to said wiper motor unit and said read out means for activating said wiper motor unit in said variable manner in response to the program read out by said read out means, said programmed means increasing the speed of the wiper motor unit at the turn around points with each wiping cycle to reduce the difference between wiper patterns for wet and dry windshield conditions.

17. In combination, a wiper motor unit for driving windshield wiper blades through repeating wiping cycles, and automatic control means for activating said wiper motor unit, said automatic control means including programmed means, controlling the activation of said wiper motor unit, said programmed means deactivating said wiper motor unit during a $\theta$ region in each wiping cycle and controlling the speed of the wiper motor unit in a manner to cause the wiper blades to enter to $\theta$ region at a predetermined reduced speed which is substantially the same irrespective of the amount of moisture on the windshield.

References Cited

UNITED STATES PATENTS

| | | | |
|---|---|---|---|
| 2,977,623 | 4/1961 | Schmitz | 15—250.12 |
| 3,003,097 | 10/1961 | Vennings | 318—443 |

ORIS L. RADER, Primary Examiner

R. J. HICKEY, Assistant Examiner